Dec. 21, 1954     H. E. WALE     2,697,776
PHOTOFLASH ATTACHMENT FOR HAND CAMERAS
Filed June 12, 1950
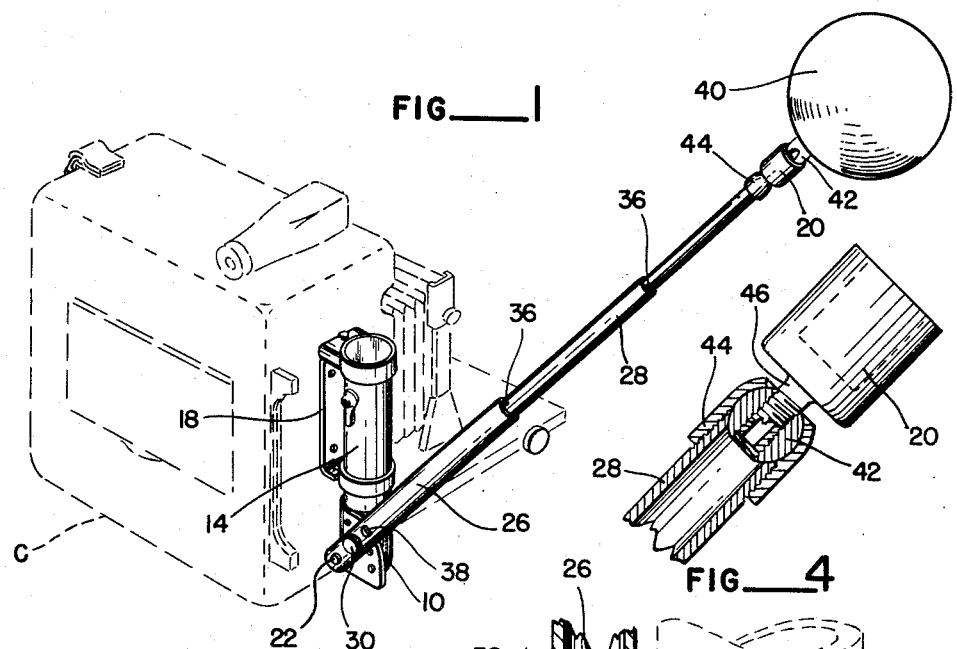
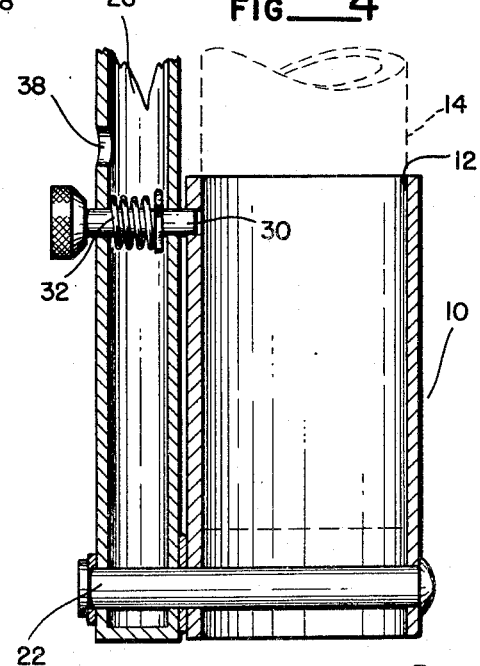
HERBERT E. WALE
Inventor
By Smith & Tuck
Attorneys

United States Patent Office 2,697,776
Patented Dec. 21, 1954

2,697,776

PHOTOFLASH ATTACHMENT FOR HAND CAMERAS

Herbert E. Wale, Retsil, Wash.

Application June 12, 1950, Serial No. 167,541

2 Claims. (Cl. 240—1.3)

This present invention consists of a bracket member adapted to be secured either to a camera or to the battery case of a photoflash device which, in turn, is secured to a camera. An extensible arm is pivotally secured to the bracket in such a manner that the flash bulb socket may be caused to assume a variety of positions all normally considerably offset from the axis of the lens so that flat lighting so common in flashlight pictures will be avoided.

The extensive development of photographic equipment in recent years has quite fully changed the technique of photographers owing to the fact that lenses have been developed with much faster speed and the present day film has an emulsion speed many times faster than the older films and plates. Consequently, the hand camera is much more generally used than formerly. This is a great advantage in that bulky equipment and the time required to set up flood lights is largely dispensed with except for very special forms of photography. Today, the majority of news photographers, commercial photographers and advanced amateurs find it necessary, or at least desirable, to supplement natural lighting with the instantaneous flash and, in order to get full value of the relatively short peak of the flash bulb, the firing of the bulb is synchronized with the shutter opening and thus the short periods of exposure which are essential to stop motion can be timed so as to occur at the high point in the illumination curve of the flash bulb. Such flash equipment has, apparently as a matter of convenience, been secured to the camera. However, this positioning of a flash bulb and its associated reflector close to the axis of the camera lens system means that all the subjects that are viewed by the camera lens are uniformly lighted by the flash bulb. This produces a flat lighting devoid of the shadow effects which, to a large degree, is the visual means of determining configuration or pattern, or in the case of individuals, the features of their faces. It is to overcome the undesirable characteristics of photographs made with present day techniques and to avoid the necessity of having separated equipment which, in turn, entails the need of assistance to the photographer, that this present device has been produced. It has been found through trial that an offset of two or three feet is normally adequate to give the shadow effects that produce the desired modeling in the subject photographed.

The principal object of this invention, therefore, is to provide a compact and convenient means for offsetting the flash bulb socket and its associated parts from the optical axis of the camera to which the equipment is attached.

A further object of this invention is to provide the necessary means in conveniently usable form so that the source of light from a flash bulb fired by a camera shutter will be sufficiently removed from the optical axis of the camera that shadow effects, to the degree desired, can be achieved in a picture.

A further object of this invention is to provide a photoflash attachment for hand cameras.

Further objects, advantages and capabilities will be apparent from the description and disclosure in the drawings, or may be comprehended or are inherent in the device.

In the drawings:

Figure 1 is a perspective view showing the photoflash attachment of this invention in the general position for use and to further illustrate this use, the battery case and bracket therefor have been shown in solid lines and a camera of a type this equipment is appropriate for use with is shown in dashed lines;

Figure 2 is a vertical sectional view through the attachment bracket and through the supporting arm with the same in a vertical position. The supporting arm is broken off and the battery case is indicated in dashed lines;

Figure 3 is a perspective view of one preferred form of mounting bracket for use with this attachment;

Figure 4 is a fragmentary elevational view, partly in section, of the photoflash bulb end on the telescopic arm.

The depicted specific embodiment of my invention is a simple construction and various modifications of my invention, providing for an extensible support of a photoflash bulb and for adjustment of the direction of the flash beam, will be apparent to those skilled in the art.

Referring more particularly to the disclosure in the drawings, the numeral 10 designates, generally, one practical form of bracket for use with this device. In this instance, the bracket is provided with a cylindrical bore 12 of a size to fit over the downwardly extending bottom of a standard battery case as 14. The form of bracket shown in Figure 3 can be readily adapted to a fair range of case sizes by merely distorting the sheet-metal forming bore 12 and when a size has been obtained that is convenient for slipping on or off the battery case, the same can be secured in adjusted position as by means of the lock screw 16. This screw is provided with a winged head for easy adjustment of bracket 10 around a vertical axis. A preferred arrangement is to use the bracket 10 in close association with the battery case 14 inasmuch as the battery case has been well developed and has the various brackets as at 18 for securing the battery case to hand cameras. The battery case may be positioned on either side of the camera. This close proximity is desirable in that the wiring is greatly simplified. The wiring, which is not shown in the accompanying drawings because it takes on so many varied forms, must, of necessity, connect with the camera shutter whether the curtain or the between-the-lens shutter is used in order that a switching means be provided, then these two conductors must be coordinated with the conductors which run from the battery case out to the photoflash socket 20, to the end that the camera shutter then will time the flow of current from the battery case to the photoflash bulb. It will be apparent, it is believed, that bracket 10 could be arranged for securing to the camera directly. However, the preferred embodiment of this invention is as an attachment so that the hand camera owner may have a conventional flash gun secured to his camera and then, when he desires to improve the modeling of a picture taken by offsetting his flash, this equipment can best be secured to the battery container because of the fact that it is already secured to the camera and it is not desirable to drill too many holes in the camera case, entirely aside from the complications of the wiring which might ensue.

A pivot pin 22 is provided, passing through the bottom portion of bracket 10 so as to have the maximum stability, and on this pivot pin is the bottom section 26 of the extensible bulb supporting arm 28. It is now necessary to provide means for holding arm 28 in the desired adjusted position and this is provided by the spring urged detent 30 which passes through tube 26 transversely and has a compression spring 32 disposed to always urge the same into engagement with one of a plurality of positioning openings 34. The arc on which openings 34 are positioned should have a center common with the axis of pivot pin 22.

A preferred construction for arm 28 is shown in Figure 1 in association with camera C. In this instance a plurality of telescopic tubular members are arranged much after the manner of arranging the telescopic section of a photographic camera tripod. The various sections are arranged for sliding within each other and limit means are provided so that they cannot be extended beyond a stable engagement and lock means are provided as at 36 so as to hold the various joints in an extended position but permitting, by the manipulation of these lock devices, the collapsing of the tube. It has been found desirable to use a tubular structure in that the electric conductors, which have not been illustrated, may be led inside the tubular structure, as through opening 38. As is very common in other forms of extensible light standard, usually the wire is coiled in a pre-formed manner so that the wire can follow out with the extension of the tubes and will be self-coiling when the tubes are collapsed. If the wiring is led inside the tubes it may be joined with the electric circuit including the battery case 14 and the shutter of the camera. The photoflash bulb socket 20 has the usual provision for the positioning of a reflector as 40 which may be easily adjusted prior to use.

It will be apparent, it is believed, from the showing of Figure 1 that with arm 28 collapsed and disposed in a position parallel to the axis of battery case 14, that very little additional bulk is provided, consequently, the device normally will be accepted by the usual camera carrying case without detaching this device. When in use, arm 28 normally is extended its full length although this is not essential if, for any reason, a photographer feels he will get suitable results with the source of light closer to the optical axis of the camera. He does, however, have the ability of placing arm 28 in any angular position between the vertical and the horizontal so that the light source within reflector 40 may be given considerable parallax and thus side lighting can be achieved which is very advantageous in making favorable photographs of people. It will be further apparent, it is believed, that this equipment can be entirely handled by the camera man without any assistance and will give him top or side lighting, as he may desire, without the necessity of transporting and assembling the customary lights in order to achieve the end result.

It is desirable that the center of the flash beam, as projected by the curvature of reflector 40 be directed at the center of the picture and one means to achieve this adjustment is illustrated in Figure 4. A flexible joint is provided on the end of arm 28 by a pierced ball 42 and an associated clamping sleeve 44. A short tube 46 is secured within ball 42 for the support of socket 20. This permits the passage of the electricity through the ball and also provides a limiting means for the swing of socket 20.

Similar adjustment for direction of the flash beam could be provided by the adjustment of lock screw 16 and detent 30; or other means could be provided at the bracket end of telescopic arm 28 to afford means for rapid adjustment of the direction of the flash beam at that point. The telescopic sections of supporting arm 28 may be rotated relative one another providing further means for adjustment of the flash beam.

It is believed that it will be clearly apparent from the above description and the disclosure in the drawings that the invention comprehends a novel invention of a photoflash attachment for hand cameras.

Having thus disclosed the invention, I claim:

1. The combination of a hand camera and an adjustable photoflash attachment, comprising: a battery case secured to said hand camera having a cylindrical portion; a bracket having a cylindrical bore in which said cylindrical portion of said battery case is rotatably positioned; manually adjustable means operable to secure said battery case in said bore; a telescopic arm having one end pivotally secured to said bracket to swing about a horizontal axis; said bracket having a series of openings spaced equidistant from the point to which said arm is pivotally secured, for vertical movement, and said arm having a detent positionable selectively in said openings to lock said arm in position relative said bracket; a flash bulb and a reflector and an electrical socket in which said bulb is positioned and on which said reflector is mounted; and a ball and socket joint connecting said electrical socket and the other end of said arm.

2. The combination of a hand camera and an adjustable photoflash attachment, comprising: a battery case secured to said hand camera having an annular portion; a bracket having an annular bore in which said annular portion of said battery case is rotatably positioned; manually adjustable means for securing said battery case in said bore; a telescopic arm having one end pivotally secured to said bracket to swing about a horizontal axis; manually adjustable means for securing said arm in various positions in relation to said bracket; and a flash bulb and a reflector and an electrical socket in which said bulb is positioned, and on which said reflector is mounted, said socket being secured to the other end of said arm.

References Cited in the file of this patent

UNITED STATES PATENTS

| Number | Name | Date |
|---|---|---|
| D. 146,390 | Tatro | Feb. 18, 1947 |
| 1,035,739 | Raes | Aug. 13, 1912 |
| 1,282,676 | Carlin | Oct. 22, 1918 |
| 1,398,278 | Pullock | Nov. 29, 1921 |
| 1,430,827 | Moeckel | Oct. 3, 1922 |
| 1,488,224 | Anderson | Mar. 25, 1924 |
| 1,832,277 | Caps | Nov. 17, 1931 |
| 2,096,856 | Nuchterlein | Oct. 26, 1937 |
| 2,115,898 | Zagora | May 3, 1938 |
| 2,329,011 | Steiner | Sept. 11, 1943 |
| 2,459,546 | Seiden | Jan. 18, 1949 |
| 2,584,912 | Palmer | Feb. 5, 1952 |

FOREIGN PATENTS

| Number | Country | Date |
|---|---|---|
| 185,986 | Switzerland | Nov. 16, 1936 |